Oct. 16, 1945.   E. SEIFRIED   2,387,042
SUB-AQUEOUS ELECTRIC CUTTING
Original Filed Oct. 12, 1921   3 Sheets-Sheet 1
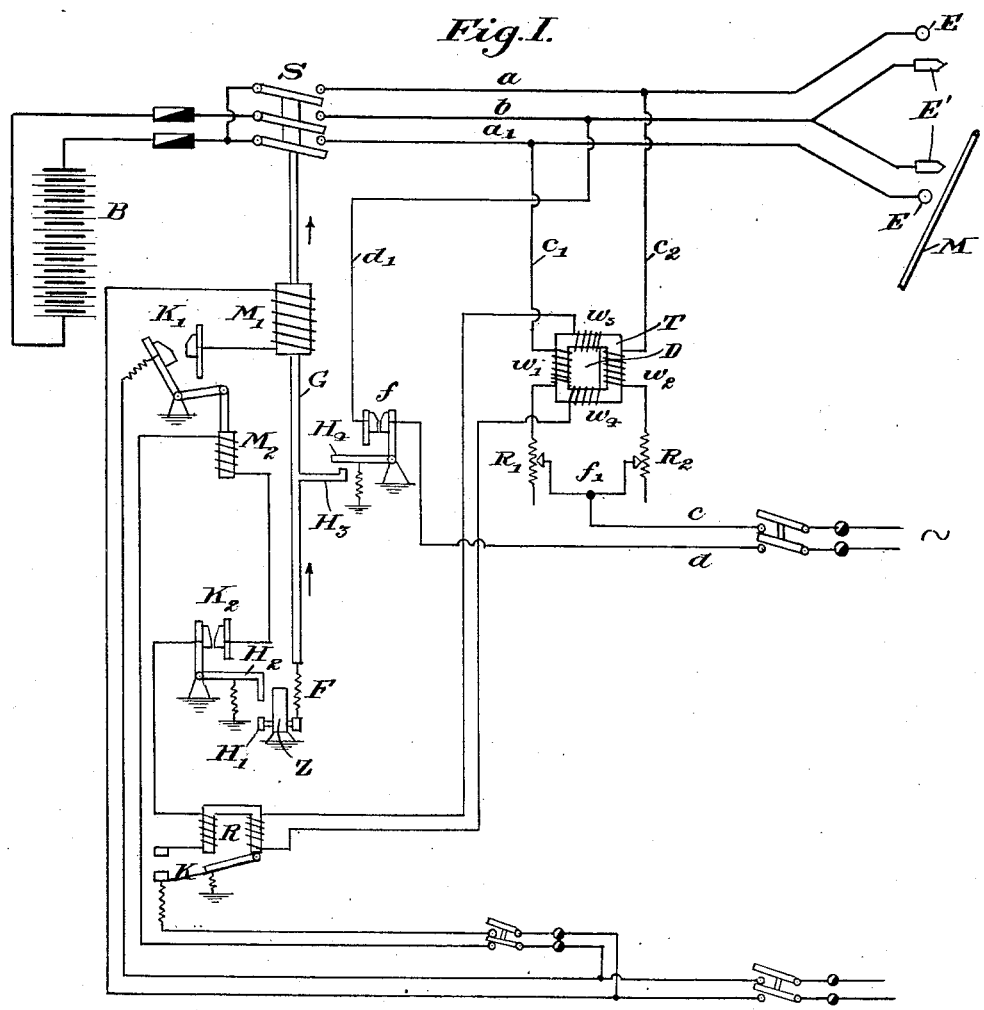
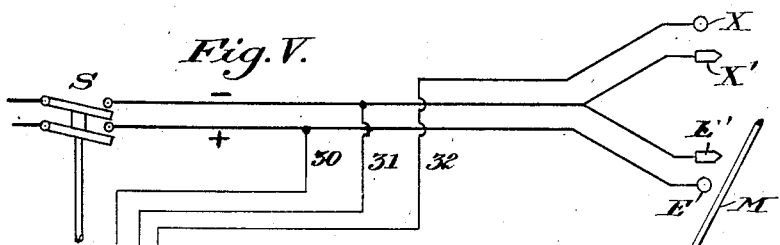
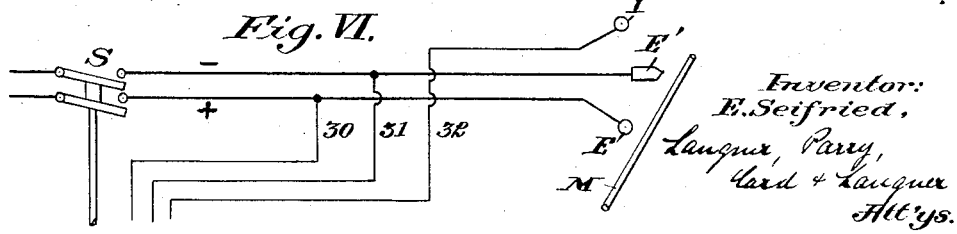
Inventor:
E. Seifried,
Langner, Parry,
Card & Langner
Att'ys.

Oct. 16, 1945.  E. SEIFRIED  2,387,042
SUB-AQUEOUS ELECTRIC CUTTING
Original Filed Oct. 12, 1921  3 Sheets-Sheet 2
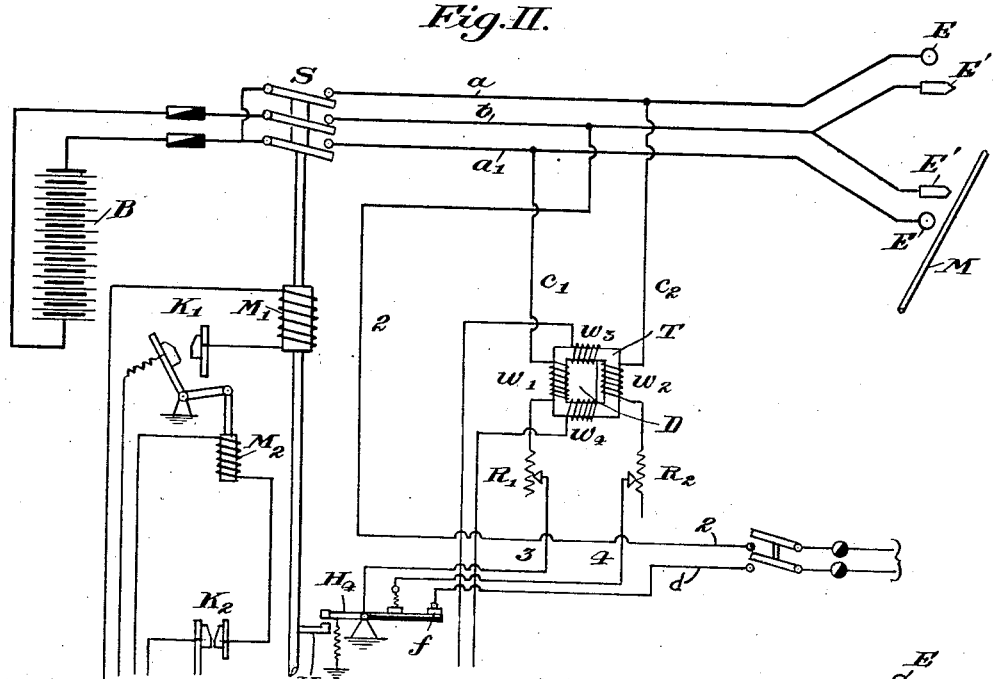
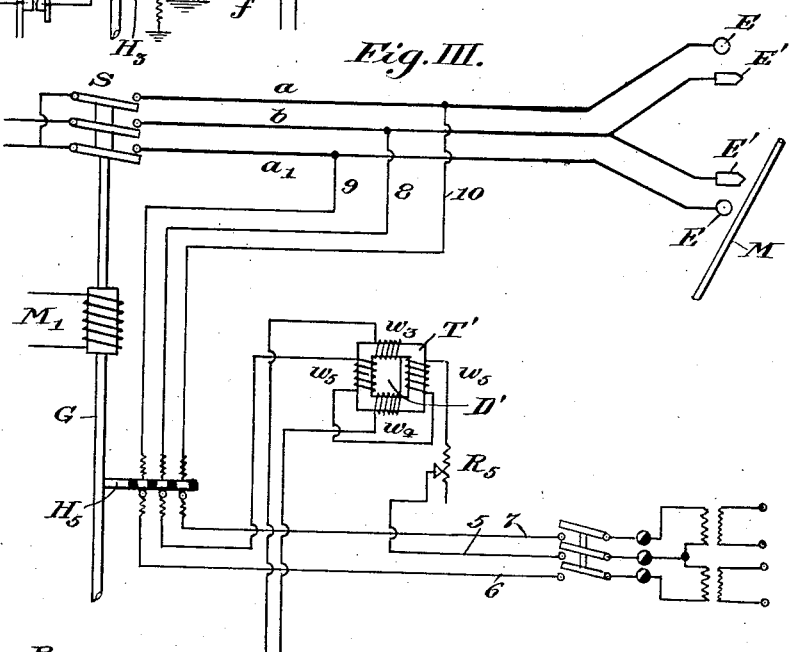
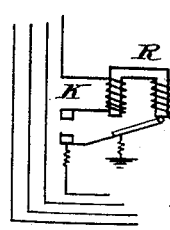
Inventor:
E. Seifried,
Langner, Parry, Card & Langner
Att'ys.

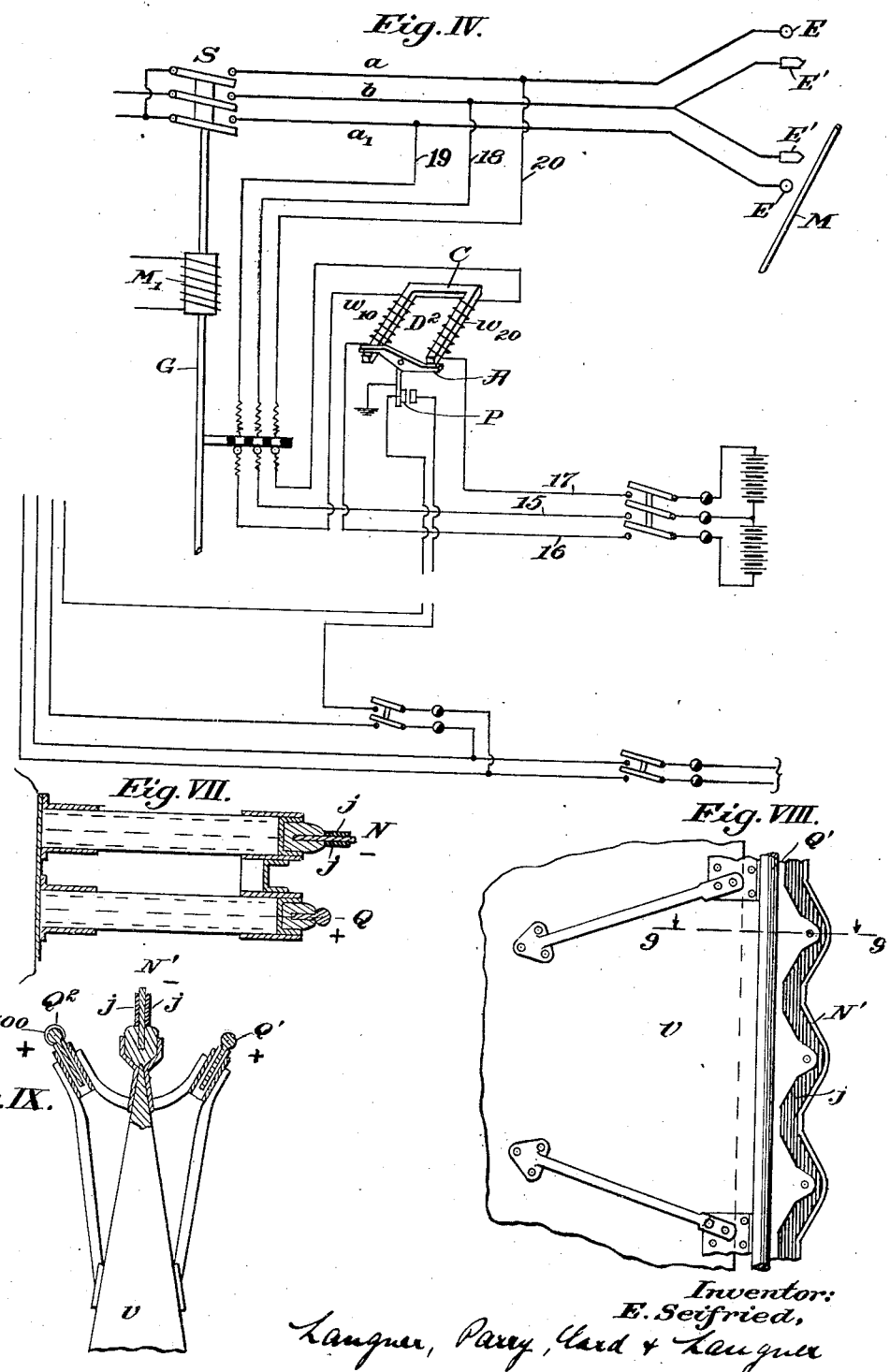

Patented Oct. 16, 1945

2,387,042

UNITED STATES PATENT OFFICE 2,387,042

SUBAQUEOUS ELECTRIC CUTTING

Eugen Seifried, assignor to the Government of the United States, as represented by the Secretary of the Navy Application October 12, 1921, Serial No. 507,350
Renewed March 16, 1926

11 Claims. (Cl. 219—11)

This invention relates to a novel sub-aqueous electric cutting method and to the system and apparatus in connection therewith. The invention is particularly suitable for use by submarine vessels for fusing or cutting through and destroying submarine obstacles such as network barriers, chains, buoy-anchors, mine tethers and the like. The field of application of the invention is particularly valuable and useful and an important aid in warfare. The method and arrangement, as will be observed, may also be used on ordinary, surface vessels, for like and similar purposes as on submarines in time of war. In times of peace, obviously the invention will have its greatest usefulness in ship salvaging operations and marine rescue work.

The invention contemplates primarily the use of direct electric current for fusing through and cutting metal under water, particularly sea water.

In its broadest aspects the invention requires submerged electrodes and a suitable source of direct current of large capacity and high potential. The electrodes are normally disconnected from the source of energy so as to prevent large current losses due to the high potential applied to the electrodes which in sea water, this being an electrolyte, would cause electrolysis and a short circuiting of the source of energy. A metallic object being brought into contact with the two electrodes, the source of energy being switched onto the electrodes, current will flow through the circuit and the metallic object will be severed.

The fusing process is, however, not so simple as it may at first appear, for if the metallic objects to be dealt with are of considerable size it is most probable that, instead of their being severed, they will become welded on to the electrodes so as to jeopardize the source of electric energy.

It is, therefore, necessary to construct the electrodes in a particular manner and to cause them to act as contacts that are more or less unsure, according to which one of the electrodes is to serve as the cutting member. This is accomplished by shaping the contacts in a certain manner and by making the different electrodes of materials having different conductivities, hardness and heating properties. To this end the invention contemplates making one electrode with a comparatively large contact surface to serve to transmit the current to the body which is being operated on, while the other, cutting electrode is made with a relatively small or narrow contacting cutting surface.

In sub-aqueous cutting by electrical means the gases formed by electrolysis have a particular effect, the gases produced promoting the generation of heat, especially at the negative pole or electrode. In order to make full use of the electrolytic effect of the negative pole for the purpose of increasing capacity of this electrode as the cutting member, it is advisable to increase the voltage of the circuit until an intensive liberation of gas takes place on the surface of the electrodes and further to bring this condition to a maximum state at the point of contact of the negative electrode and the metallic body which is to be cut. To use as little energy as possible, it is proposed to cover with insulation all such surfaces of the negative electrodes as are not required for the cutting operations. The insulation obviously must not only be capable of resisting the effects of the electrolysis, but also be of such sufficient mechanical ability as to resist the pressure of the water when the vessel on which the apparatus is mounted, is in motion. The insulation must, therefore, be mechanically solid and must consist of some material which is consumed in the same proportions as the electrode which is being used for cutting. Otherwise as the metal of the electrode is being consumed the insulation would remain and would eventually interfere with and interrupt the cutting operation. In short the insulation must be mechanically, electrically and electrolytically stable.

In order to make use of the above mentioned effect of electrolysis, the lateral surfaces, in fact all surfaces of the cutting electrode which are not required in the cutting action are covered with insulated layers. These layers by resisting the electrolysis and by hindering the flow of current into the sea water assist in intensifying the current density at the exposed cutting surface of the electrode. The capability necessary to sever the metallic object under water depends on the combination of (1) the specific current density existing at the place of contact between the cutting electrode and the metallic object and (2) the resistance layer formed by the electrolytically generated gas bubbles surrounding the place of contact of electrode with the object. The electrolysis generates a gaseous layer or envelope which surrounds the cutting electrode and forms an insulating sheath or cover at the place of contact with the metallic object. The insulating layers on the surface of the electrode, which surfaces do not take part in the severing operation, assist in the directing and intensifying of the above described combined effect, so as to render it available as the cutting or severing agent. The layers of insulation on the electrode, also, it will be noted help to confine the formation of gas bubbles to that part of the electrode which does not have the insulating covering and thereby intensify the electrolytic action to the cutting surface.

It is further well known that certain metal containing materials oxidize very rapidly by electrolytic action when they are emersed in certain electrolytes, such as sea water or a solution having a high percentage of sodium chloride, and an electric current is sent through them. These materials furthermore continuously build or form an oxide layer on the surface exposed to the electrolyte, which layer has a high electrical resistance. Among such materials antimony is a particular example. The invention, therefore, contemplates the use of antimony or antimonous materials as the substance to be used for some of the electrodes. Antimony when employed as an electrode submerged in sea water oxidizes rapidly with the formation of a layer of an oxide of the metal on all of the surfaces of the electrode. This oxide has a high resistance to the electric current and forms continuously, and, therefore, as long as the layer of oxide exists on the electrode, the loss of electric energy at that point is greatly diminished and may be completely prevented. On an electrode as just described encountering an object the metallic oxide layer is mechanically scraped away or destroyed and if the object is of metal, electric current passes at the point of contact with the electrode and the cutting or fusing process will commence at the point of contact, with the usual development of gases due to the electrolysis of the sea water.

As the invention is employed on vessels floating on or beneath the surface of the sea, it is not possible to continually apply the high operating voltage to the electrodes, because, sea water being an electrolyte and having high conductivity, this would result in a great loss and waste of the electrical energy. Further the steel shell of the boat would also become charged and in case of any defect in electrical installation within the vessel, there would be a short circuit of the battery or generator with all of its consequent dangers, and inconveniences.

To avoid this, a switching arrangement is provided which only connects the full operating voltage to the electrodes at the moment when some metallic obstacle touches two electrodes of opposite polarity, and this same arrangement again restores the normal preparatory voltage to the electrodes when the fusing or cutting operation is completed.

The electrical arrangement, therefore, contemplates the application of normal or preparatory low voltage being impressed on the electrodes, which voltage is replaced during cutting operation by the energy from some high tension source, and which energy on completion of the cutting operation is removed and the low tension voltage again impressed on the electrodes.

Since the interconnection or bridging between electrodes of different polarity will sometimes be hardly noticeable as on their contacting with a steel rust-encrusted cable, and on the other hand as the conductivities of sea water vary considerably, the circuit arrangement must not only be automatic in operation, but must also be extremely sensitive and at the same time perfectly reliable in operation. These objects are fully provided for in the electrical system disclosed in which the operation depends on the counterbalancing magnetizing coils connected either to different pairs of electrodes or to different balancing parts of the circuit.

The invention will now be described by reference to the accompanying description and drawings in which—

Fig. I is a diagrammatic illustration of one arrangement of apparatus required to carry out the invention;

Fig. II is a diagrammatic illustration of a view of the apparatus showing a slightly different control circuit from that shown in Fig. I, some of the elements of the apparatus being omitted for the sake of clearness;

Fig. III is a second diagrammatic illustration similar to Fig. II, but showing a further modification of the control circuit;

Fig. IV is a diagrammatic illustration of an arrangement of apparatus showing the control apparatus operating the main switch without the use of a relay;

Figs. V and VI show parts of the circuit arrangement similar to the previous views, but showing the use of auxiliary balancing electrodes;

Fig. VII is a vertical cross-section of one form of disposing the electrodes at the side of a vessel;

Fig. VIII is a fragmentary side view of a different form of constructing the electrodes located at the bow of a vessel; and Fig. IX is a horizontal cross-section of the arrangement shown in Fig. VIII taken on the line 9—9.

In the drawings the letters EE' represent pairs of electrodes arranged in any suitable manner on the submarine preferably at the bow thereof, E in each instance representing a positive electrode and E' similarly the negative electrode of each pair. For the purposes of this invention these electrodes may either be rigidly or movably mounted anywhere in the vessel carrying them. A main switch S is provided for connecting the electrodes to a battery B or other suitable source of direct current having a high potential and large capacity. When an operating voltage is applied to the electrodes and a metallic body, such as M is brought into contact with them the section of the body situated between the electrodes will be fused by the electric current that flows through it, i. e. the body M will be burnt through or severed.

At the switch S one conductor from the source B is divided into two branches and from the switch the current is led by three conductors $a$, $a_1$ and $b$ to a point near the electrodes EE' and EE'. Here the middle conductor $b$ is also divided so that two or more pairs of conductors or supply mains are obtained, each pair of which comprises a positive and negative lead connected to the respective electrodes arranged, say at the port and starboard sides of the vessel. The control circuit by which the switch S is controlled and operated, is connected to the three conductors $a$, $a_1$ and $b$ that lead to the electrodes.

Two distinct conditions of the fusing or cutting electrical system are to be particularly noted, viz: the normal condition of preparedness, and the condition of operation. In the normal condition shown in Fig. 1, the main switch S and the auxiliary switch $K_1$, controlling electro-magnet $M_1$ of the main switch are both open. The contact K of the relay R is also open, but the contact $K_2$ controlled by the timing device Z is closed and thus prepares a circuit to be closed at the contact K. All parts of the control circuit are connected to the ordinary low tension supply mains of the ship. These mains may be provided with either continuous or alternating current, but the arrangement illustrated in Fig. I assumes that the supply mains are provided with alternating current.

The conductors $a$, $a_1$ and $b$ as previously stated leading to the electrodes, are connected to the low tension mains through wires $c_1$ and $c_2$ leading to the outside electrodes $a_1$ and $a$, respectively. The wires of the supply mains are illustrated at $c$ and $d$. The conductor $c$ at the point $f_1$ is divided into two branches leading to the coils $w_1$ and $w_2$ of the counterbalancing apparatus D. The coils $w_1$ and $w_2$ are symmetrically arranged on an iron core T and are connected by the wires $c_1$ and $c_2$ respectively to the conductors $a_1$ and $a$. The other conductor $d$ leads to the normal closed contact $f$ and $f$ is connected by conductor $d_1$ to the middle conductor $b$ of the cutting circuit at a point before said conductor $b$ is divided. The contact at $f$ is actuated by the operating rod G of the electro-magnetic main switch S. Between the branching point $f_1$ and the coils $w_1$ and $w_2$ are rheostats $R_1$ and $R_2$. The coils $w_1$ and $w_2$ are wound on the core T so as to produce opposite magnetizing effects and thus do not induce currents in the other coils $w_3$ and $w_4$ also wound on the core T by induction and the relay R, therefore, normally remains de-energized.

Now if on movement of the vessel carrying the electrodes a metallic body such as wire rope M is encountered and bridged by a pair of electrodes a weak current will flow over $c$, $f_1$, $w_1$, $c_1$, $a_1$, E, the body M, E', $b$, $d_1$, $f$ and $d$. This current impulse will disturb the magnetic equilibrium of the coils $w_1$ and $w_2$ so that the current will be induced in the coils $w_3$ and $w_4$. This will cause energization of relay R which on attracting its armature will close contact K and so cause the energization of the magnet $M_2$ which energization will close the contact $K_1$ and this in turn close the circuit of $M_1$ of the main switch. The energization of $M_1$ will cause the closing of main switch S through upward movement of the rod G as shown by the arrow, and operating current from source B is thus at once supplied to the electrodes so that they commence the fusing or cutting operation.

The closing movement of the main switch S through the upward movement of rod G causes the winding up of a timing mechanism diagrammatically shown at Z by means of a spring F attached to the lower part of the bar G. The timing mechanism may be of any suitable construction desired but carries a lever $H_1$. When the time which is supposed to be necessary or which experience has shown to be sufficient for one working operation or cutting of a cable, is elapsed, the lever $H_1$ will be liberated and pressed against the lever $H_2$ connected to the contact $K_2$. This is due to the tension of the spring F. The lever $H_2$ when moved, breaks the contact $K_2$ and this contact on its part breaks the circuit of the auxiliary switch $M_2$ $K_1$. The opening of this switch causes the de-energization of the magnet $M_1$ of the main switch and the latter then open the operating circuit.

During the closing movement of the main switch, that is by the upward movement of the rod G, a lever $H_3$ attached to rod G encounters and actuates the lever $H_4$ connected to contact $f$ and breaks the control circuit at that point. The opening of contact $f$ prevents the low tension current $c$, $d$ joining the heavy current from the source B with the consequent damage to the apparatus connected to $c$, $d$.

It is evident that in a similar manner the apparatus could be arranged so that instead of breaking the conductors which are connected to the middle lead $b$ of the operating circuit, the conductors connected to the outside leads could be broken at, for example, the point $f_1$. Such an arrangement is illustrated in Fig. II. In this view the conductor $d$ has two leads direct to contact $f$, but the conductor $c$ of Fig. I is in this view replaced by the conductor 2 leading directly to the conductor $b$ of the operating circuit at a point prior to the dividing point of that circuit. In Fig. II the circuits through the windings $w_1$ and $w_2$ are carried separately to the contact lever $H_4$ by means of conductors 3 and 4. Contact lever $H_4$ is normally spring pressed to close the circuit over the conductors $d$, 3 and 4, but on the upward movement of the rod G in the closing operation of the main switch S the lever $H_3$ on the rod G strikes the lever $H_4$ so as to break the circuit through the windings $w_1$ and $w_2$.

In Fig. III there is illustrated a different embodiment of the control system and shows an arrangement wherein the supply main is a three wire system instead of a two wire system. In this form instead of employing to counter-acting balancing coils each connected to the outside supply leads of the main work circuit as in the other views, there is shown a single coil in two sections connected to the middle supply lead of the work circuit. This coil is designated $w_5$. The differential counter-balance as a whole is indicated at D'. The two coils $w_3$ and $w_4$ in this form as in the previous forms both are connected to the relay R. All coils are wound on the core T'. The main supply leads are indicated by the numerals 5, 6 and 7, the middle conductor being designated by the first mentioned numeral. The coil $w_5$ is connected in circuit with this conductor of the supply main by means of the conductor 8 leading to the middle conductor of the work circuit. Numeral 9 designates the conductor connecting the outside lead $a_1$ to the conductor 6 while the numeral 10 indicates the conductor connected to the other outside work circuit lead $a$ connected to the wire 7. In this form the upward movement of the rod G breaks all three leads 8, 9 and 10 that are connected to the work circuit leads, by means of a lever $H_5$ rigidly attached to the bar G. This lever in the normal position is so disposed as to close the circuit through the conductors 8, 9 and 10, but when the bar G moves upwardly the circuit through all three of the conductors 8, 9 and 10 is broken and thus the control circuit completely removed and separated from the work circuit.

Obviously other counter balancing arrangements for effecting the operation of relay R may be employed all within the scope of this invention.

It will also be obvious that the different current impulses caused by disturbance of the counter-balance, and causing a flow of current in the control circuits, when a pair of electrodes carrying the control potential is bridged, as herein before described, may also be made to affect the electro-magnets $M_1$ and $M_2$ directly instead of through means of the relay R, and a number of induction coils on the core of the counter-balanced device.

In Fig. IV there is illustrated an embodiment in which the counter-balanced device $D^2$ directly controls the circuits of the magnets $M_1$ and $M_2$. In this view the numerals 15, 16 and 17 represent the middle and two outer conductors of the three wire supply mains of the ship, here illustrated as carrying direct current, in which the center conductor 15 is connected by means of the conductor 18 to the middle supply lead of the work circuit, while the outside conductors 16 and 17 are connected to windings $w_{10}$ and $w_{20}$ of the counter-balanced device. The counter-balanced device in this form has a U-shaped core C. The windings $w_{10}$ and $w_{20}$ are connected to the outside leads of the work circuit $a_1$ and $a$ by means of the conductors 19 and 20, respectively.

In the normal condition of the circuit the magnetic effect of the coils $w_{10}$ and $w_{20}$ counter balance each other and the spring controlled armature of the counter-balanced device. A holds the contact P open. Any disturbance of the counterbalance of the device $D^2$ will cause an attraction of one end or the other of the armature A and the consequent closing of the circuit at the point P. The closing of the circuit at the point P will close the circuit to the magnets $M_1$ and $M_2$ disposed as in Fig. I. Upward movement of the rod G closing the main switch S in this form breaks the control circuit at three points by means of the lever $H_5$ in the manner as described in the previous embodiment.

In the various embodiments thus far described, those parts of the arrangement which are common to the form shown in Fig. I have not been further described nor illustrated for the sake of clearness.

In the various examples thus far described and illustrated in the drawings, the systems each time have shown a plurality of pairs of operating electrodes and the balancing of the preparatory current effect in one pair against that in the other pair. In an arrangement provided with only a single pair of operating electrodes it would be necessary, in order to obtain the very sensitive differentiating action required, to provide auxiliary electrodes which electrodes would also have to be arranged to be submerged in the sea in such a manner that the conductivity of the conducting medium (the water) between the pair of operating electrodes and the auxiliary electrode pair would always correspond to each other in every respect. The auxiliary electrodes may, of course, be made much smaller than the operating electrodes and the electrical differences caused thereby could be compensated in the balancing circuits by properly proportioning the number of turns of the counter-balancing windings, or adjusting the resistances $R_1$, $R_2$.

In Fig. V there is shown an arrangement of only a single pair of operating electrodes E and E' and a pair of auxiliary electrodes X and X'. In this form the work circuit is shown as a two wire circuit connected directly to the work electrodes E and E' and the negative conductor of the work circuit being branched and being connected to the auxiliary electrode X'. The auxiliary electrode X in this embodiment performs the same function as the one work electrode E shown in Fig. I. In this embodiment the conductor 30 is connected to the positive lead of the supply circuit, the conductor 31 to the branched negative lead and the conductor 32 to the auxiliary positive electrode. The conductors 30, 31 and 32 correspond to the conductors $c_1$, $c_2$ and $d_1$ in Fig. I and to the corresponding three conductors in the other embodiment described and illustrated.

It is obvious that the operation of the circuit will be the same, it being merely necessary that the electro-magnetic effect of the preparatory potential across the electrodes E and E' be balanced by the effect of the same potential across the auxiliary electrodes X and X'. The auxiliary electrodes as they are never used for cutting purposes in the cutting operation may be made much smaller than the work electrodes and may be disposed in a sheltered position on the vessel, the only requirement being that the auxiliary electrodes also be submerged.

In Fig. VI there is shown an arrangement wherein instead of having a pair of auxiliary electrodes the work electrode E' performs the double function of also acting as an auxiliary electrode. The other one of the auxiliary electrode pair in this form is indicated by the reference character Y. The work circuit in this embodiment is again shown as a two wire circuit and the conductors 30, 31 and 32 are the three conductors leading to the control circuit as in the other embodiments.

In Fig. VII there is shown an arrangement in vertical section in which the electrodes are illustrated as being placed one above the other and extending from the side of a vessel $v$. This form is particularly useful in cutting cables or the like which extend in a more or less vertical manner. The negative electrode is indicated as a whole by the letter N and the positive electrode by Q. The negative electrode is shown composed of a comparatively flat bar of which the non-working, non-cutting surfaces are covered by layers of insulation $j$. It will be noted that only the edge of the bar acts as the cutting, operating surface. The positive electrode on the other hand comprises a bar of metal of which a comparatively much larger surface is exposed to come into contact with the metal which is to be cut. The positive pole may, for example, be readily formed of iron or steel bars somewhat of the shape of railway rails, while the negative electrodes on the other hand may preferably be made of copper bars.

In Fig. VIII there is a fragmentary side elevation of an arrangement of electrodes that are placed side by side, a fragmentary section of this form taken on the line 9—9 being shown in Fig. IX. In these last two views the negative electrode is indicated in general at N' and the positive electrodes, there being two, at Q' and $Q^2$. The negative electrode again has its non-working surfaces covered with insulation $j$. It is to be noted that in this form the negative electrode roughly has a saw-shape, that is its cutting edge is undulating.

In Fig. IX the positive electrode $Q^2$ is shown as covered with a layer of an antimonous compound 100. If a positive electrode as previously set forth is provided which electrode comprises antimony, this antimony of the positive electrode in the presence of salt water forms oxides of antimony which completely cover such surfaces of the positive electrode as are exposed to the water.

The layers of insulation $j$ shown in Figs. VII, VIII and IX take part in concentrating the high specific current density of the negative electrode to the point of contact between such electrode and whatever metal body with which it may come in contact, because this insulation being formed of a material which does not easily break down under the electrolytic action, does not permit the electric current to flow through the same and thus all the current supplied to the negative electrode is compelled to pass through and is forced through and out of the working surface of the negative electrode.

During the cutting action this concentration is further augmented by the gas bubbles of the dissociated water completely covering all such surfaces of the electrodes as are not in contact with the metal. As previously stated this electrolytic action is accomplished by increasing the voltage used during the cutting operation. It is to be noted that this invention contemplates the constant application, that is the constant maintenance of contact between the electrodes and the metal which is being cut, in contra-distinction to such process in which an arc is formed by first contacting the metals and then withdrawing the cutting electrode from the metal being cut. In this invention no arc is formed but through the concentration of the current density such a great heat is developed that the metal is fused and melted away.

The preferable form of negative electrode shown for example in Figs. VII, VIII and IX, that is an electrode with a rather sharp edge permits the application of a comparatively line contact between the cutting electrode and the metal being operated on.

Throughout the specification and claims, the term "electrode" is intended to mean any circuit terminal which connects the circuit to the electrolyte, here the sea water. The metallic shell of the boat itself, for example, might thus be an electrode.

The term "operating surface," as applied to the electrodes, means such surface of the electrode, as plays a part in the severing action. Similarly the "non-operating surfaces" are the surfaces of the electrode which do not co-operate in the severing action.

The invention, however, obviously is not limited only to the particular form of electrodes described and illustrated, nor to the materials particularly set forth.

What is claimed and desired to secure by Letters Patent is:

1. Apparatus for electric sub-aqueous cutting of metal comprising, submerged electrodes, a high potential source of direct current normally disconnected from said electrodes, a low potential source of current normally connected to said electrodes, and an electro-magnetically counter-balanced means in the low potential circuit for connecting said high potential source to the electrodes and disconnecting said low potential source upon disturbance of the electro-magnetic balance of the counter-balanced means.

2. Apparatus for electric sub-aqueous cutting of metal comprising, submerged electrodes, a high potential source of direct current normally disconnected from said electrodes, a low potential source of current normally connected to said electrodes, and an electro-magnetically counter-balanced means in the low potential circuit for connecting said high potential source to the electrodes and disconnecting said low potential source upon said electrodes encountering a metallic object.

3. Apparatus for electric sub-aqueous cutting of metal comprising, a plurality of submerged electrodes, a source of high potential normally disconnected from said electrodes, a source of low potential normally connected to said electrodes, the low potential circuit being divided into two sections, each section including pairs of submerged electrodes, and an electro-magnetically counter-balanced means in the low potential circuit, the counter-balancing components of which are in the different sections of the low potential circuit, and means whereby upon any pair of said submerged electrodes encountering a metallic object and disturbing the balance of the counter-balancing means, the high potential source is connected in circuit with the electrodes encountering the metallic object, and whereby said low potential source is disconnected from said pair of electrodes.

4. Apparatus for electric sub-aqueous cutting of metal comprising, submerged electrodes, a source of high potential normally disconnected from said electrodes, a normally open electro-magnetic main switch connected between the source of potential and the electrodes, a source of low potential normally connected to said electrodes comprising a low potential circuit, and an electro-magnetically counter-balanced means in the low potential circuit whereby upon said electrodes encountering a metallic object the main switch is operated to closed position and the movement of said main switch causes the breaking of the low potential circuit.

5. Apparatus for electric sub-aqueous cutting of metal comprising, submerged electrodes, a source of high potential normally disconnected from said electrodes, a normally open main switch, magnetically operated means for closing said main switch connected between the source of potential and the electrodes, a source of low potential normally connected to said electrodes, and an electro-magnetically counter-balanced means in the low potential circuit for causing the energization of the main switch magnet upon said electrodes encountering a metallic object, whereby the main switch is closed and the magnetic means in the closing movement breaks the low potential circuit.

6. Apparatus for electric sub-aqueous cutting of metal comprising, submerged electrodes, a source of high potential normally disconnected from said electrodes, a normally open main switch for connecting said source of high potential to said electrodes, operating means for said main switch, a normally de-energized magnet for moving said means to closing position, a source of low potential normally connected to said electrodes, an electro-magnetically counter-balanced means in the low potential circuit for controlling the energization of the main switch magnet upon said electrodes encountering a metallic object, a spring tensioned timing device positioned to be actuated by the main switch, the spring of which is wound up by the closing movement of the main switch operating means, said movement directing the low potential circuit, and means whereby after a certain time interval the timing device causes the breaking of the main switch operating a magnet and restores the main switch to open position.

7. A sub-aqueous electric cutting apparatus, comprising at least one pair of electrodes, sources of different direct potential, means for normally applying the smaller of said sources of potential across said electrodes and means responsive to the bridging of said pair of electrodes by an electrical conductor for removing the source of potential normally applied thereto and applying the larger of said sources thereto.

8. A sub-aqueous electric cutting apparatus including electrodes, a source of low potential normally connected with the electrodes, a source of high potential normally disconnected from the electrodes, an electromagnetically counter-balanced means for connecting the high potential source to and disconnecting the low potential source from the electrodes, and means for automatically disconnecting the high potential source from the electrodes after a predetermined time interval.

9. A sub-aqueous electric cutting apparatus including electrodes, a source of high potential, a source of low potential, means for connecting either of said potentials to the electrodes, and means for disconnecting the high potential after a predetermined time interval of connection.

10. A sub-aqueous electric cutting apparatus including electrodes, a source of low potential normally connected to the electrodes, a source of high potential normally disconnected from the electrodes, means for disconnecting the low potential from the electrodes when they are bridged by a metal, means for connecting the high potential to the electrodes when the low potential is disconnected, means for disconnecting the high potential after a predetermined time interval, and means for re-connecting the low potential when the high potential is disconnected.

11. Sub-aqueous cutting apparatus, comprising a pair of submerged electrodes, means to apply low direct current potential to said electrodes, means to balance the electromagnetic effect associated with said low potential, means automatically responsive to unbalance of said effects to cut off said low potential and apply high potential, and means to cut off said high potential after a predetermined time.

EUGEN SEIFRIED.